No. 811,625. PATENTED FEB. 6, 1906.
H. H. EDMONDS.
INSTRUMENT FOR GRAPHICALLY SOLVING SPHERICAL TRIANGLES
ON A PLANE SURFACE.
APPLICATION FILED JUNE 15, 1905.
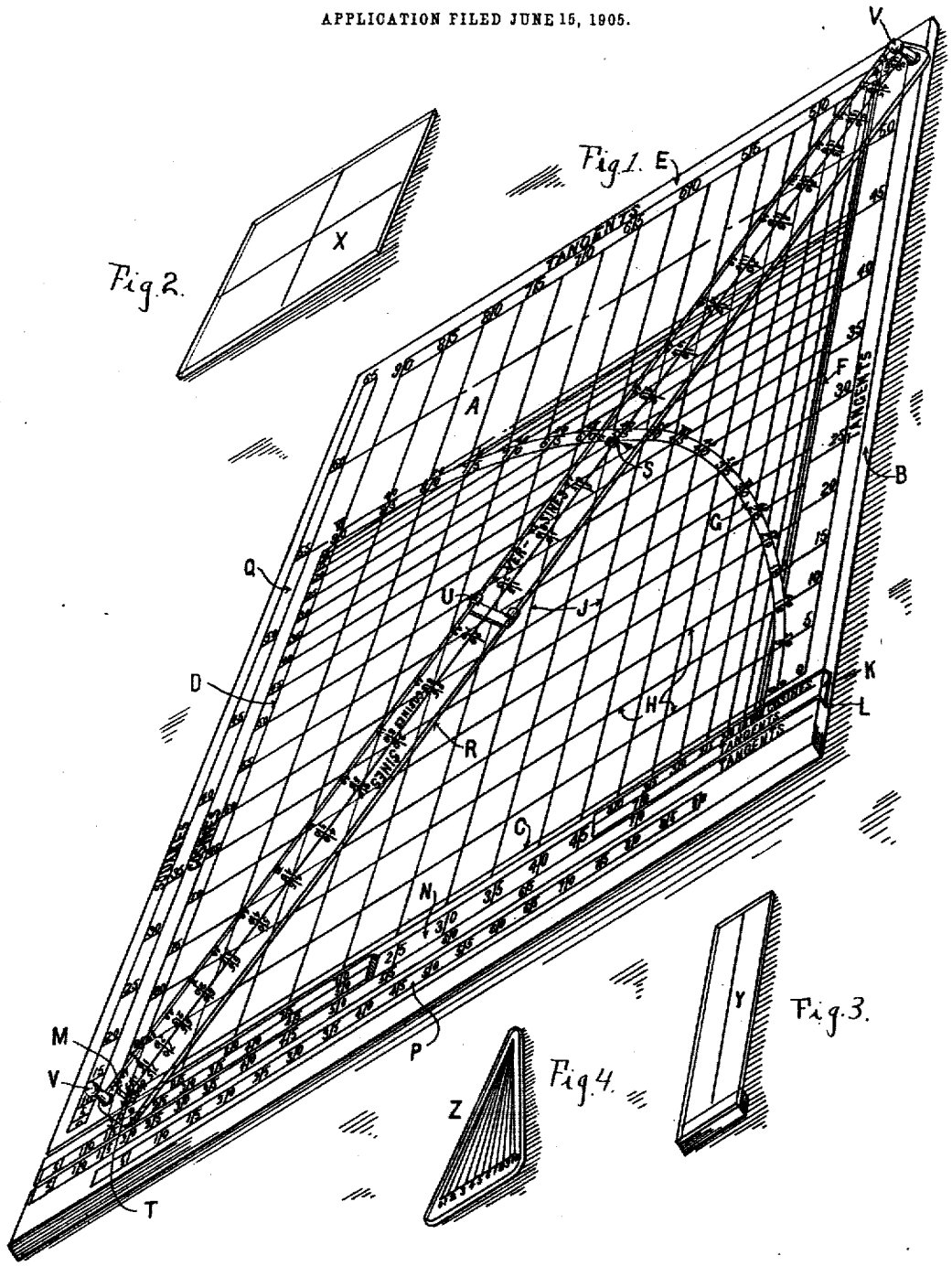
Witnesses
Percy Newell
Cyril Church
Inventor
Herbert H Edmonds
per Fred Walsh
Attorney

UNITED STATES PATENT OFFICE.

HERBERT HENRY EDMONDS, OF LONGUEVILLE, NEAR SYDNEY, NEW SOUTH WALES, AUSTRALIA.

INSTRUMENT FOR GRAPHICALLY SOLVING SPHERICAL TRIANGLES ON A PLANE SURFACE.

No. 811,625.      Specification of Letters Patent.      Patented Feb. 6, 1906.

Application filed June 15, 1905. Serial No. 265,379.

*To all whom it may concern:*

Be it known that I, HERBERT HENRY EDMONDS, master mariner and instructor in navigation, a subject of the King of Great Britain, residing at "Idalia," Longueville, near Sydney, in the State of New South Wales and Commonwealth of Australia, have invented an Improved Instrument for Graphically Solving Spherical Triangles on a Plane Surface, of which the following is a specification.

This invention relates to an improved instrument, hereby named the "spheroplane," whereby spherical triangles may be graphically solved on a plane surface. Hence also by it may be solved all ordinary spherical problems in navigation and nautical astronomy, for which it has been specially devised, while it will be found useful whenever spherical problems have to be solved.

This improved instrument for graphically solving spherical problems, or spheroplane, consists of a peculiarly-scaled plane surface and certain movable parts, hereinafter particularly described and explained.

My invention is shown in the accompanying drawings, in which—

Figure 1 is a perspective view showing the spheroplane tilted upwardly in order to show more clearly the scales and workings thereon. Fig. 2 is a perspective view of the plane marker X. Fig. 3 is a like view of the side marker Y, and Fig. 4 is a like view of the subdivider Z.

In the drawings, A is the plane surface; B, the support; C, the base; D, the left vertical; E, the upper margin; F, the right vertical, and G the arc.

H represents horizontals, and J verticals.

K is the slide, (in the slot L,) having thereon the scales.

M is the center pin at the center of the arc, and N shows bottoms of the slot with sine numbering thereon.

P is a scale of equal parts, and Q is a scale of squares of numbers.

R is the movable radius-bar, having red center S and blue center T, divisional markings, a marker U, and handles V. The plane marker X, the side marker Y, and the subdivider Z are the useful accessories, hereinafter described.

I will first describe the instrument and thereafter set forth the principles on which it is constructed and then give a few examples of its utility.

The spheroplane consists of a plane surface, henceforth called the "plane," and on this is movable radius bar or bars and a sliding scale. The plane consists of a perfectly flat surface of metal, celluloid, or other material of rectangular form mounted on a support of sufficient thickness to insure rigidity. The sides of the support should be perfectly parallel to the sides of the plane, or if the plane is of any thickness should be flush with the sides of the plane. Upon the plane is described a perfect square. A margin is left on each side thereof about one-twelfth of a side of the square, and at the bottom, henceforth called the "base," of about one-eighth of a side of the square. The square is extended upward until there is a margin left at top of about one-twelfth of a side of the square. This upward extension should be at least equal to one-half of a side of the square, as it is of importance for solving two of the problems—the altitude azimuth and the hour-angle problems. When it is required to find these angles up to not less than one hundred and twenty degrees, the ratio of the sides to base must be as above 1.5, and if said angles are required to be found up to not less than one hundred and fifty degrees then the ratio 1.866 will be required. The base considered as unity may be of any size. Twenty inches has been found to give as good results as necessary. The left-hand intersection of side and base is made the center of the plane, and from this center, with the base as radius, a quadrant of a circle is described to be terminated by the base and "left vertical," as the left side will henceforth be called, this quadrant being called the "arc." About one-quarter of an inch below the base and parallel to it is a groove or slot, henceforth called the "slot," this slot to be wider at the bottom than at the top and to run right across the plane and support and its width at the top to be about half an inch. Through this slot travels a slide on the slide-rule principle. This slide just fits the slot, so that its only possible motion is longitudinal, while its length is just the width of the support, and for convenience it has a small handle at its right-hand end. The slide is divided longitudinally by a straight line to divide the two scales which be engraved on it, the upper one being a cosine scale and the lower one a tangent scale. The slide being placed in position with its ends flush with the sides of the support, the left vertical is extended downward to the longitudinally-dividing line of said slide, and said vertical is marked with an arrowhead where it meets the slide, which arrowhead is used as the index of the cosine slide or scale. The base from the arc center to the right is divided to sines, each division being one degree, and the left vertical from the arc center up to the arc is divided the same way, these scales being either sines or cosines, according to which way they are numbered. When numbered from the arc center toward the arc from "0°" to "90°," they are sines, when from the center toward the arc from "90°" to "0°" they become cosines. Through each of the divisions on the base, commencing at the longitudinally-dividing line of the slide and extending right to the end of the plane, are straight lines parallel to left vertical, hereinafter called "sine verticals" or "cosine verticals," according to which way they are numbered. For cosine verticals they may be conveniently numbered on the cosine scale on the slide from "90°" at the arc center or index to "0°" at the arc, and for sines from "0°" at the arc center to "90°" at the arc below the slide on the bottom of the slot, so that when sines are required the slide may be withdrawn to reveal them. Parallel to the base from the divisions on the left vertical to the right vertical are horizontal lines, hereinafter called "sine horizontals" or "cosine horizontals," according to which way they are numbered. Just outside the left vertical they are numbered for cosine horizontals from "90°" at the arc center to "0°" at arc. The arc is divided into degrees of arc or smaller divisions from "0°" at base to "90°" at left vertical and also to time outside the arc divisions from naught hour at base to six hours at left vertical. It will be seen that each vertical line and each horizontal line intersects a division on the arc, and thus the horizontal lines are numbered for sines and the vertical lines for cosines by the numbers on the arc, which is convenient when the cosines are required for time. The right vertical is a tangent to the arc and is divided throughout its length to tangents, each division being one degree, which may be subdivided, the divisions to be marked and numbered outside the plane from the base up from "0" toward "90." The top horizontal is to be divided to cotangents from "90" at left vertical to "45" at right vertical. These tangents and cotangents are divided to the same scales as the sines and cosines where radius equals unity equals tangent forty-five degrees. Preferably the horizontals and verticals, and also scale divisions, have every fifth division marked a different color, a very good distinction being to have ordinary lines and divisions black and fifth ones red, while having the tangent and cotangent divisions and the lines they are divided on of blue. The remaining scales now to be described are conveniently marked in green and are for solving the exmeridian problem only. The lower longitudinal half of the slide and the plane below it for the same width are divided and numbered into twin scales of tangents from left to right and from "0" toward "90°," the "0°" coinciding with the "90°" on the cosine slide, but this only for uniformity. If the plane be a small one—say of fifteen inches radius—this scale is better commenced close over to the left to allow of more degrees of tangents being marked, which should not be less than seventy-five degrees in these scales, tangent forty-five degrees being one and tangent seventy-five degrees being 3.732, taking a quarter of the width of the plane as unity. Tangents up to seventy-five degrees can be included on these scales. Below the slide and tangent scale and parallel to these is a scale of equal parts, where 30.56 must equal one division and unity may conveniently be taken as one two-hundredths ($\frac{1}{200}$) of an inch, so that each division equals .1528 inch and one hundred divisions, which is more than is required, would equal 15.28 inches. The above scale is suitable for a plane of fifteen-inches radius; but if of twenty-inches radius then one one-hundredth of an inch is a better unit, and then one division equals .3056 and sixty-five of these would be contained in twenty inches. The zero of this scale of equal parts must be at the extension of left vertical. Outside the left vertical and its numbering and parallel to it, commencing from the left continuation of the base, is a scale of squares of numbers from "0" at base to "60," more or less. As the left vertical will allow the same unit to be used in this as was used in the lower base-scale of equal parts just described, horizontal green lines may be drawn through these divisions to the right vertical, but only above the sine and cosine horizontals. At the intersection of the left vertical and base—i. e., the arc-center—is securely fixed a pivot about one-sixteenth inch thick slightly tapering upward. This pivot should be made of any hard metal which will not corrode at sea, and its height is conveniently about three-quarters ($\frac{3}{4}$) of an inch. With this plane surface is combined a movable radius-bar made of stout transparent celluloid about one-twentieth of an inch thick, from one and a half to two inches wide, and about two inches longer than the diagonal of the plane. The sides of this radius-bar are parallel throughout its length, and a medial straight line, called the "radius," runs from end to end parallel to the sides. On this radius are pierced two holes, one about one inch from one end to be called the "blue center," the other distant from the first exactly the radius of the arc called the "red center." The size of these centers is such that they just fit over the pivot without play when the radius-bar is flat on the plane. The radius is divided into a scale of sines from the red center toward the blue center and from the red center toward the other end of radius as far as the radius will allow. These divisions are the same as those on the base and left vertical of the plane, so that when the red center of radius is shipped over the pivot and the radius made to coincide with either of these lines the divisions on the radius will be superimposed over the divisions on the plane. The divisions are numbered from the red center toward the blue from "0°" to "90°" to sines above the radius, the word "Sines" preferably being printed above the numbers, and are numbered from the red center toward the blue from "90°" to "0°" to cosines below the radius, the word "Cosine" preferably being printed below. The lower divisions are also numbered to time from six hours at red center to naught hours at blue. When the radius-bar is reversed and the blue center is used, these last-named numbers come on top and become versines in arc or time when starting from blue center, since they only go up to "90°" or "6$^H$" at red center. These numbers are continued on to the other end of the radius to "150°," or ten hours, more or less, as the length allows. The divisions on the radius are on the underneath side, so that they are touching the plane, while the numbering is on the upper side. On the upper side are fixed two small handles, one at each end, clear of the divisions to facilitate working with it, the extreme end of the radius beyond the blue center to be called the index when the red center is used and the part beyond the red center to be called the index when the blue center is used, and as these centers will be on the arc, respectively, when the other center is used, one degree of arc subdivided to quarter-degrees may be conveniently marked on each side of the radius just outside these centers, so as to enable the radius to be set exactly at any quarter-degree.

A radius-marker is made to slide along the radius-bar. A strip of thin vulcanite answers the purpose well, and it conveniently should be about half an inch wide. This marker being made, say, an inch longer than the width of the radius-bar, the ends may be bent over by means of heat to grip the radius-bar with sufficient tension to prevent slipping, and the inside should be white to allow the radius divisions to be seen. The position of the marker is underneath the radius-bar, and either edge can be used to mark any desired division on the radius.

Certain convenient accessories are provided with the plane surface and radius-bar— namely, a plane marker, a side marker, and a subdivider—of the construction and usefulness as follows: A plane marker is made of a rectangular sheet of thin transparent celluloid, such as is used as a support for photo-negative-films, and such a support with the film stripped off answers very well, five inches by four inches being a suitable size. This is bisected vertically and horizontally by two fine straight lines scratched thereon with printers' ink, then rubbed in to blacken them, and it is used to mark intersections of vertical and horizontals, it being used with the lines next to plane to avoid parallax. A side marker on the T-square principle is made of the same material, with a similar single line bisecting its width, (about three inches by one inch is a suitable size,) the celluloid being cemented to a strip of wood about three inches by half an inch, say, by means of acetone, forming the T-head. This head takes on the side of the plane, and any outside divisions may be carried into the plane by means of the medial line. A subdivider is convenient, though not generally needed. This may be made of the same material and is marked by taking a one and a quarter-inch chord of a circle of three-inches radius, dividing it to ten equal parts, and joining the divisions and center. By making the outside lines to coincide with any division not greater than one and a quarter inches the division may be subdivided to tenths. These divisions of the subdividers are numbered from "0" to "10" at the wide end.

The fundamental principle from which the spheroplane is evolved is derived from the trigonometrical ratios. Taking one of them as an example, we have sine A equals $\dfrac{\text{perpendicular}}{\text{hypotenuse}}$, where A is the acute angle at the base of a plane right-angled triangle. By means of this if the quotient of two numbers, which in the case of the sine ratio must be less than unity, be known and the value of one of these numbers also known, the value of the unknown may be found by the rules for solving plane right-angled triangles if we make the angle A such that its sine is equal to the known quotient. As an example, let $a = \dfrac{x}{b}$ first. As above, where $a$ is less than unity let $a$ equal sine $\Theta$. Then in a right-angled plane triangle make A equal $\Theta$ and make the hypotenuse equal to $b$. Then solving by calculation or construction we shall find the perpendicular is equal to $x$, or if $a$ is greater than unity then let $a$ equal cosecant $\Theta$. Then in a plane right-angled triangle make A equal $\Theta$, and since the ratio for cosecant is $\dfrac{\text{hypotenuse}}{\text{perpendicular}}$ make the perpendicular equal $b$. Then solving, we shall find the hypotenuse equals $x$. In like manner we might have substituted for the quotient any other of the ordinary trigonometrical functions. In navigation an everyday illustration of this principle and the one that suggested its general application is that of finding the difference of longitude corresponding to a given departure, or vice versa. The formula and proof of this are given in every elementary treatise on navigation; but a slight modification of the usual proof will better answer the present purpose, as follows: The difference of longitude is an arc of the equator intercepted between two meridians. The equator being a great circle, its radius is unity. The departure or meridian distance is the length of a similar arc of a lesser circle whose radius is equal to the cosine of latitude. Then as circles and equal arcs of circles are proportionate to their radii we have $\frac{\text{cosine latitude}}{1}$ equals $\frac{\text{departure}}{\text{difference longitude}}$ equals $\frac{\text{base}}{\text{hypotenuse}}$. So if we make the angle at the base of a right-angled triangle to equal the latitude and the hypotenuse to equal the difference of longitude the base will be found by solving to equal the departure. In this way every day at sea the difference of longitude corresponding to a departure or the converse is found either by calculation or by inspection in the transverse tables. Obviously we may also find the angle whose trigonometric function is equal to the quotient of two known numbers, and having found the angle the function may be taken from tables or scales which would give that quotient, if required. The principle is equally applicable where the numbers to be divided represent any of the trigonometric functions of an angle or any power of those functions, or they may represent the meridional parts of an angle or of course plane numbers, or in the case where both these quantities are known the quotient may be any of the ordinary trigonometric functions of an angle compatible with its magnitude other than the versine, and in one of these forms a plane right-angled triangle can in various ways be made to solve directly any case in right-angled or quadrantal spherical triangles or indirectly any case of oblique angled spherical triangles. As an example of the former, suppose tangent C to equal $\frac{\text{tangent B}}{\text{cosine X}}$. Since the ratio for tangent is $\frac{\text{perpendicular}}{\text{base}}$ in a plane right-angled triangle make the angle at the base to equal C. Then, if either for calculation we suppose or by construction we make the perpendicular to equal the numerical value of tangent B by calculation or construction, the base will be found to give the value of cosine $x$, or if the perpendicular is divided to a scale of tangents and the base to a scale of cosines and we have an adjustable hypotenuse capable of being set at any given angle the value of $x$ may be found graphically. Again, we may transform our formula to the form cosine $x = \frac{\text{tangent B}}{\text{tangent C}}$, the ratio for cosine being $\frac{\text{base}}{\text{hypotenuse}}$, so making the base to equal tangent B and the hypotenuse to equal tangent C by calculation or construction the angle at the base will be $x$, and if the base of the right-angled plane triangle be divided to a scale of tangents and the adjustable hypotenuse be similarly divided the angle $x$ may be read off by means of a protracter. In the case of an oblique-angled spherical triangle we may have versine $x = \frac{\text{cosine}(a+\pi) - \text{cosine } c}{\text{cosine } a \quad \text{cosine } b}$. Here, by adding, let $a + b$ equal M, then cosine M − cosine C may be evaluated by a slide-rule with a twin scale of cosines which call cosines $\psi$ for the denominator let cosine $a$ cosines $b$ equal $\Theta$ cosine. Therefore cosine $a = \frac{\text{cosine } \Theta}{\text{cosine } b}$, and in this form cosine $\Theta$ may be determined on the principles already discussed. The formula then stands versine $x$ equals $\frac{\text{cosine } \psi}{\text{cosine } \Theta}$ or cosine $\Theta$ equals $\frac{\text{cosine } \psi}{\text{versine } x}$, which can be solved in the same way, the ratio for cosine being $\frac{\text{base}}{\text{hypotenuse}}$. If we make the angle at the base to equal $\Theta$ and the base to equal cosine $\psi$, then the length of the hypotenuse is equal to versine $x$. So if the base be divided to a scale of cosines and the hypotenuse to a scale of versines and we have means of setting the hypotenuse to an angle $\Theta$ with the base, the value of $x$ may be read off from the hypotenuse. The spheroplane is arranged to perform these operations graphically. They include all the ordinary spherical problems in navigation or nautical astronomy—namely, azimuth when rising, azimuth at greatest elongation, altitude azimuth, time azimuth, exmeridian-hour angle at rising or at any other time when the altitude is observed. In theory it solves these accurately. In practice the degree of accuracy is limited only by the size of the instrument and the workmanship. A spheroplane of fifteen inches radius divided to degrees will solve the various azimuths to the nearest quarter-degree or less, the exmeridian problem to the nearest half-minute of arc if the observations have been taken under ordinary conditions, and the hour-angle problem to the nearest minute of time easily.

A few examples will now be given to illustrate the use of the spheroplane, dealing with at least one example of the different types of problems. These here given and other problems can be worked in various different ways, which the intelligent navigator who grasps its principles can select for himself.

On inspecting the spheroplane it can be seen that it is divided vertically and horizontally by straight lines. These become sine or cosine verticals and sine or cosine horizontals, according to where their readings are taken from. It can also be seen that each vertical and horizontal cuts the arc at an even division, so that the numbers on the arc which number the degrees also number the verticals or horizontals which pass through them. For cosine verticals the readings are taken from the numbers on the upper scale of the slide when in normal position. For sine verticals the slide is withdrawn, and the readings are taken from the numbers now exposed on the bottom of the slot. Cosine verticals, if required in time, may be read by the time division on the arc through which they pass. The horizontals become cosine horizontals when they are read from the scale on the left vertical and sine horizontals when read from the divisions on the arc through which they pass.

"To revolve radius" means to revolve it on one of its centers and does not mean to change centers. "To reverse radius" means to change centers. "To set the radius" means to set it at any given angle on the arc, and when set this angle is called the "setting." "To mark radius" means to slide the marker along the radius-bar until its edge marks a given division on the radius. Either edge of the marker may be used; but it is better to use the inner edge when horizontals or verticals are to be taken from the base or left vertical and the outer edge when they are to be taken from the top or right vertical. When the red center of the radius is used, if it be directed to mark the sine of an angle the upper numbers are used; but if the cosine the lower numbers on the radius-bar are used. When the radius is marked at a certain division, it is referred to as the "marking."

In these examples the form and style of formula and workings usually observed in mathematical investigation are used and retained, and in addition the following phrases when used herein have the particular meanings set forth, as follows: "To withdraw slide" means to draw it out to the left. "To push in slide" means to push it in to the right hand. Unless otherwise stated the red center is to be used until it is directed to reverse centers, when the blue center is used.

The examples will now be set out.

(a) To find the azimuth of a celestial body when rising:

Rule: Set the radius at the latitude. Remove the slide. The sine vertical of declination (read from slot) cuts the radius at cosine azimuth, (lower reading.) Cosine $\Phi = \dfrac{\text{sine } \delta}{\text{cosine } z}$.

Example 1: (From Stebbings *Navigation*, page 187.) Required the sun's azimuth when rising when declination is 8°.58′ N. and latitude 52°.20′ N. The result is N. 75°.13′ E. Set the radius at latitude 52°.20′. Remove the slide. The sine vertical from 8°.58′ in slot gives cosine azimuth N. 75¼ E. on (lower reading) radius. This is named N. because declination is N. and E. because rising.

(b) To find the greatest azimuth or azimuth at greatest elongation. This phenomena can only occur when the celestial body has declination of the same name and greater than the latitude of observer; but since there are always stars under these conditions and considering that at this phenomena the body is fixed at azimuth, only altering the azimuth one-quarter of a degree in one hour of time or thereabout, we have a very useful observation for determining compass error brought within the limits of practical navigation by means of the spheroplane, hitherto little used except by surveyors.

Rule: Set the radius at latitude. The cosine vertical of declination (from slide) cuts the radius at sine azimuth, (upper reading.) Name as latitude and hour angle. Cosine $\Phi = \dfrac{\cos. \delta}{\sin. z}$.

Example 2: Given latitude 10° S., declination 20° S. Required the greatest azimuth. Set the radius at 10°. The cosine vertical of 20° (read from slide) cuts the radius at sine 72°.6. Davis's time azimuth tables, page 81, will verify this.

Example 3: Required the greatest azimuth of star Canopus from an observer in 30°.30′ south latitude. Star's declination is 52°.38′ S. Set radius at 30°.30′. The cosine vertical of 52°.36′ (from slide) cuts the radius at sine azimuth S. 44°.9. As is the case with other azimuths, we shall require to know either the hour angle or altitude at this phenomena.

(c) To find hour angle (time) of body when at its greatest azimuth, having given the azimuth just found and declination:

Rule: Mark the sine declination or radius, (upper part.) Revolve the radius until the marking cuts the cosine horizontal of azimuth, (left vertical.) The setting is the hour angle (read from arc) sin. $H = \dfrac{\cos. z}{\text{sine } \delta}$.

Example 4: Given azimuth 72°.6 and declination 20°.S. Mark sine 20° on radius. Revolve this until it cuts cosine horizontal of (azimuth) 72°.6 from (left vertical.) The setting (read from the arc) is 4ᴴ.4ᴹ., the hour angle. This may be verified by Davis's tables, page 81.

Example 5: Required the hour angle of the star Canopus, declination 52°.6 S, when at its greatest azimuth, 44°.9. Mark sine 52°.6 on radius. Revolve this until it cuts the cosine horizontal of 44°.9. The setting 4ᴴ.13ᴹ is the hour angle.

Note. In the case of finding time of greatest azimuth the azimuth is always required also, so it is more convenient to find the hour angle through the azimuth.

(d) To find the altitude when at its greatest azimuth:

Rule: Set the radius at declination. The sine horizontal of latitude (read from arc) cuts the radius at the sine altitude (read from upper part) $\sin.\ \delta = \dfrac{\sin.\ \Phi}{\sin.\ a}$.

Example 6: Latitude 10°.S., declination 20°.S. Required the altitude when at greatest azimuth. Set the radius at 20°. The sine horizontal of 10° (read from arc) cuts the radius at sine altitude 30°.5. (By calculation this is 30°.31'.)

Example 7: Latitude 30°.30'S. Required the altitude of star Canopus, declination 52°.38'S., when at greatest azimuth. Set radius at 52°.38'. The sine horizontal of latitude 30°.30' cuts the radius at 39°.6. (By calculation this is 39°.41'.)

(e) To solve the time azimuth problem, tangent method. In the following instructions if the hour angle is over six hours it must be subtracted from twelve hours and the remainder used for the hour angle.

Rules: Mark cosine declination on radius, (lower reading.) Set the radius at the hour angle. The sine horizontal that cuts the marking is arc I, (read from arc.) Reverse the radius. Mark the plane marker and place radius over the intersections of cosine vertical of hour angle (read from arc) and tangent horizontal of declination, (from right vertical.) The setting of radius is arc II if the hour angle be less than six hours; but this arc must be subtracted from one hundred and eighty degrees if the hour angle be over six hours. For arc III add arc II and latitude, if latitude and declination are of contrary names; but subtract them if of the same. For azimuth when arc I is contained on the right vertical (the general case) mark with plane-marker and place radius over the intersection of tangent horizontal of arc I (from right vertical) and sine vertical of arc III, (from slot.) The setting is the azimuth. When arc I is not included on the right vertical, proceed as follows: Set radius at arc I. Sine horizontal of arc III (from arc) cuts radius at cotangent vertical of azimuth. Name azimuth opposite to the latitude, except when latitude and declination are same names, with latitude less than arc II.

Example 8: Hour angle or time $3^H.24^M$ p. m., declination 19°.S., latitude 50° N. Mark cos. 19° on radius (lower part) and set radius at hour angle $3^H.24^M$. The sine horizontal read from arc is arc I 47°.4. Reverse radius to blue, center mark with plane marker and place radius over the intersection of cosine vertical hour angle $3^H.24^M$ (read from arc) and tangent horizontal declination 19°, (from right vertical.) The setting is (arc II) 28°.7, which, as latitude and declination are contrary names, has to be added to latitude 50° and gives (arc III) 78°.7. Now mark with plane marker and place radius over the intersection of tangent horizontal (arc I) 47°.4 (from right vertical) and sine vertical (arc III) 78°.7, (from slot.) The setting is azimuth S.47°.9 W.

Example 9: This shows the case of a star with high declination and with a large hour angle. Latitude 51°.30' N. Required the azimuth of star Capella, declination 45°.54' N., when its hour angle is $9^H.36^M$ west. Here, as the hour angle is over six hours, we must subtract from $12^H$, giving $2^H.24^M$. Mark cosine declination 45°.54' on radius (lower) and set it at $2^H.24^M$. The sine horizontal (read from arc) is (arc I) 24°.2. Mark and place radius over intersection of cosine vertical hour angle $2^H.24^M$ (from arc) and tangent horizontal declination 45°.9 from right vertical. The setting is arc 51°.9, which has to be subtracted from one hundred and eighty degrees. Since hour angle is over six hours, the remainder, 128°.1', is arc II. From this arc II subtract the latitude 51°.5; gives 76°.6 arc III. Mark and place radius over intersection of sine vertical (arc III) 76°.6 (from slot) and tangent horizontal (arc I) 24°.2. The setting N.24°.7 W. is the azimuth. By calculation this works out at 24°.44½'.

Example 10: Since in the foregoing Example 9 the declination is over forty-five degrees, we may show how to find II if declination were not on the scale of tangents, as follows: Set the radius at declination 45°.9. The cosone horizontal of hour angle in arc 36° (from left vertical) cuts radius at cotangent vertical of (arc II) 51°.9 from top, as before.

The investigation of the time azimuth problem, tangent method, as used above, is as follows: In a diagram let P mark observer's pole and polar angle, $z$ his zenith, S the position of heavenly body, Q the equator, Q Z the latitude, S Z M the azimuth required. From S draw the arc of great circle at right angles to P Q, cutting P Q at M, then in triangle P S M.

S M. = arc L sin. arc I = sin. P. sin. P S.

$\sin.\ P = \dfrac{\sin.\ \text{arc I}}{\cos.\ \delta}$  Q M = arc II = (90° − P. M.)

Cos. P = cot. Q M cot. P S.

$\cot.\ \text{arc II} = \dfrac{\cos.\ P}{\tan.\ \delta}$, or, if declination is large, $\tan.\ \delta = \dfrac{\cos.\ P}{\cot.\ \text{arc II}}$  Z M = arc III = Q Z ⊥ Q M Sine Z M = cot. S Z M tan. S M.

$\cot.\ \text{azimuth} = \dfrac{\sin.\ \text{arc III}}{\tan.\ \text{arc I}}$, or, if arc I is too great for tangent scale, $\tan.\ \text{arc I} = \dfrac{\sin.\ \text{arc III}}{\cot.\ \text{azimuth}}$.

(f) To solve the altitude azimuth problem:

Rule: Given the latitude of observer, the altitude and polar distance (the polar distance is always the declination subtracted from ninety degrees) of a celestial body, to find its azimuth write down the latitude and under it the altitude. Add them if latitude and declination are contrary names. Subtract them if same names. Call result M. Mark cosine altitude on radius, (lower marking,) which set at latitude. The cosine vertical which cuts marking, read from slide, gives N. Reverse radius and set it at N. Withdraw slide until polar distance on it is at the index. The cosine vertical of M on the slide will cut radius at cosine azimuth, which name as declination and hour angle.

Example 11: (Taken from Stebbing's *Navigation*, page 190.) Sun post Meridiem, given latitude 27°.45′ S., N. polar distance 67°.57′, altitude 22°.18′. Add latitude 27°.45′ S. to altitude 22°.18′, giving M 50°.3′. Mark cosine 22°.18′ on radius (lower part) and set at 27°45′. The cosine vertical that cuts the marking, read from slide, is 35°, or N. Reverse radius and set it at 35°. Withdraw slide until the polar distance 67°.57′ on it is at the index. The cosine vertical of M 50°.3′ from slide will then cut radius at azimuth N. 47°.6′ W. (Stebbing gives N. 47°.37′ W.)

Example 12: (Stebbing's *Navigation*, page 194.) Sun antemeridian, given latitude 30°.50′ N., N. polar distance 82°.53′, altitude 27°.7′. Required, azimuth. Subtract altitude 27°.7′ from latitude 30°.50′ N., giving M = 3°.43′. Mark cosine 27°.7′ on radius and set it at 30°.50′. The cosine vertical cutting the marking gives N. 40°.1′ on slide. Reverse radius. Set it at 40°.1′. Withdraw slide until cosine polar distance 82°.53′ on it is at the index. The cosine vertical of M 3°.43′ will then cut the radius at versine azimuth N. 98°.3′ E. (Stebbing gives N. 98°.14′ E.)

Example 13: This is an extreme case. Star Capella east, given latitude 51°.30′ N., N. polar distance star Capella 44°.6′, true altitude 12°.12′. Subtract altitude 12°.12′ from latitude 51°.30′ N., giving 39°.18′. Mark cosine 12°.12′ on radius and set it at latitude 51°.30′. The cosine vertical cutting the marking (read from slide) gives N 52°.6′. Reverse radius and set at (N.) 52°.6′. Withdraw slide until polar distance 44°.1′ on it is at the index, when the cosine vertical of M. 39°.18′ from the slide cuts the radius at N. 24°.7′ E., the azimuth. A calculation by logarithm gives this as N. 24°.44½′ E.

(g) To solve the hour-angle problem. Given the latitude of observer, the declination, and zenith distance of a celestial body to find its hour angle:

Rule: Write down the latitude, under it the declination. If they are same names, subtract them, if of different names add them. Call result M. Mark cosine declination on radius (lower marking) and set it at latitude. The cosine vertical which cuts the marking (read from slide) gives N. Reverse radius and set it at N. Withdraw slide until index is at zenith distance on the slide. The cosine vertical of M (from slide) will then cut the radius at the versine of hour angle. If the body be on the horizon, proceed the same way exactly, except that the slide is not withdrawn. This latter would give the time of geocentric or true rising; but for the time of apparent rising, except in the case of the moon, the zenith distance would be greater than ninety degrees, and the slide must be pushed in by this excess. The same principle applies to the problem of finding when twilight begins or ends, which is assumed to be when the sun is eighteen degrees below the horizon, so that the slide in this case must be pushed in eighteen degrees, and proceed as in the general case.

Example 14: General case, Stebbing's *Navigation*, page 139. Sun antemeridian, given latitude 40°.16′ N., declination 10°.48′ N., zenith distance 70°.10′ N. Required, sun's hour angle from latitude 40°.16′ N. Subtract declination 10°.48′ N., giving M as 29°.28′. Mark cosine 10°.48′ on radius (lower part) and set it at 40°.16′. The cosine vertical that cuts the marking (read from slide) is N. 41°.4. Reverse radius and set it at 41°.4. Withdraw slide until the zenith distance 70°.10′ on it is at the index. The cosine vertical of (M) 29°.28′ from slide cuts the radius at versine hour angle $4^h.52^m.1^s$. (Stebbing gives $4^h.52^m.16^s$.)

Example 15: Stebbing, page 140. Sun post-meridian, given latitude 39°.25′ S., declination 23°.14′ N., zenith distance 74°.13′. Required, the apparent time at place. Add latitude and declination, giving M = 62°.39′. Mark declination 23°.14′ on radius (lower part) and set radius at latitude 39°.25′. The cosine vertical (read from slide) cutting the marking is N = 44°.7. Reverse radius and set it at (N) 44°.7. Withdraw slide until index points to zenith distance on slide 74°.13′. The cosine vertical from (M) 62°.39′ on the slide will then cut the radius at versine hour angle (time) $2^h.50^m.5^s$. (Stebbing gives $2^h.50^m.25^s$.)

(h.) To solve the exmeridian problem. The green scales only are to be used in this problem. The scale on the lower part of the slide is termed the "slide-scale." The twin scale immediately below it is termed the "standing scale." The zero on either scale is, respectively, the index of the other scale. The lower scale of all P, divided to equal parts, are minutes of arc in reduction, to be added to the true altitude when observed above the pole to obtain the meridian altitude. This is called the "reduction-scale." The vertical scale to the extreme left is called the "hour-angle" scale. Each division is one minute of time. Given the latitude by account, the declinations, and the hour angle in minutes of time, to find the reduction:

Rule: First, to find N, if latitude and declination are contrary, push in the slide until its index cuts at declination on standing scale. Then the latitude on slide cuts at N. on standing scale, which note. If latitude and declination are same, withdraw slide until index on standing scale cuts declination or latitude, whichever is least on slide. Then the greater of these two on slide cuts at N. on standing scale. Use long radius (blue center) and set it at N. Then the horizontal of minutes in hour angle, read from hour-angle scale, cuts the radius at vertical of reduction, which read from reduction-scale. The T-square marker is useful in this problem for carrying the divisions in outer scales into the plane and for contrawise prolonging the reading to the scale.

Example 16: (Stebbings *Navigation*, page 160.) Given latitude account 47°. N., (this is fifty-eight minutes in error,) declination 20°.47' N., hour angle 20.1 minutes. Required, the reduction to be applied to true altitude to obtain meridian altitude, latitude and declination same names. Withdraw slide until index of standing scale cuts 20°.47'. Then 47° on slide cuts the standing scale at (N) 34°.7. Set the radius at (N) 34°.7, the horizontal from 20.1$^M$ on the hour-angle scale cuts the radius at the vertical of reduction 19'.3. (Stebbing gives 19'.6.) It is to be noted that 20' would give the exact latitude. A second approximation would give this; but this is hardly necessary even in this extreme case with latitude account 58' in error.

(*i*) The formula used in right angles and quadrantal spherical problems are the same as generally used for these problems and are hereinbefore respectively set out after the rule for each problem. The formulæ for oblique-angled sperical problems, altitude, azimuth, hour angle, and exmeridian problems are here given, the usual notation being adopted, when Z equals azimuth, $\delta$ equals declination, $a$ equals altitude, $\Phi$ equals latitude, H equals hour angle, $z$ equals zenith distance, $p$ equals polar distance from nearest pole. In the practical rules $\psi$ is called M and $\Phi$ is called N.

The altitude azimuth:

$$\text{Cos. } Z = \frac{\cos. \Phi \, p - \sin. \Phi \sin. a}{\cos. \Phi \cos. a}.$$

$$\text{Versine } Z = \frac{\cos. (\Phi \perp a) - \cos. p}{\cos. \Phi \cos. a}.$$

Let $(\Phi \perp a) = M$, let $(\cos. M - \cos. p) = \cos. \psi$, also let cos. $\Phi$ cos. $a = \cos. \Theta$.

$$\therefore \cos. \Phi = \frac{\cos. \Theta}{\cos. a} = \frac{\text{base}}{\text{hypotenuse}}.$$

Then $$\text{ver. } Z = \frac{\cos. \psi}{\cos. \Phi},$$

or $$\cos. \Phi = \frac{\cos. \psi}{\text{ver. } Z} = \frac{\text{base}}{\text{hypotenuse}}.$$

The hour angle problem:

$$\text{Cos. } H = \frac{\cos. z - \sin. \Phi \sin. \delta}{\cos. \Phi \cos. \delta}.$$

$$\text{Vers. } H = \frac{\cos. (\Phi \perp \delta) - \cos. z}{\cos. \Phi \cos. \delta}.$$

Let $(\Phi \perp \delta) = M$, let $(\cos. M - \cos. z = \cos \psi$, also let cos. $\Phi$ cos. $\delta = \cos. \Theta$.

$$\therefore \cos. \Phi = \frac{\cos. \Theta}{\cos. \delta} = \frac{\text{base}}{\text{hypotenuse}}.$$

Then $$\text{vers. } H = \frac{\cos. \psi}{\cos. \Theta}$$

or $$\cos. \Theta = \frac{\cos. \psi}{\text{vers. } H} = \frac{\text{base}}{\text{hypotenuse}}.$$

The Exmeridian: A formula very generally used in modern methods of working this problem and one easily deduced from that given in Godfrey's *Astronomy* is $$r = \frac{h^2}{30.36 \, (\tan. \Phi \perp \tan. \delta)}$$

where $r$ is the reduction required, $h$ equals minutes of time in hour angle, 30.56 is a constant. The only alteration necessary to adapt this to the spheroplane is to let $(\tan. \Phi \perp \tan. \delta) = \tan. N$. Then $$\text{Tan. } N = \frac{h^2}{r \times 30.56} = \frac{\text{perpendicular}}{\text{base}}.$$

It can easily be seen that the spheroplane need not necessarily be made exactly as described. Other scales may be added to the plane and existing ones varied, as shown in the explanation already given. Other slides with additional scales may be introduced, as also additional radii divided to other scales may be also used with the same plane, particularly one divided to tangents. These alterations would extend the scope of the spheroplane in particular cases; but the construction already given is most adaptable for general use. The spheroplane might be made with fewer scales for individual problems or groups of problems.

Having now fully described and ascertained my said invention and the manner in which it is to be performed, I declare that what I claim is—

1. An improved instrument for graphically solving spherical triangles on a plane surface consisting essentially of a rectangular plane surface on which are inscribed a graduated quadrant and various trigonometric and other scales in relation to said quadrant a slide on the slide-rule principle having therein a scale of cosines and a scale of tangents in relation to said graduated quadrant and covering up the numbering of a scale of sines also in relation to said graduated quadrant a center-pin on said plane surface at the center of the graduated quadrant and a removable transparent radius bar or bars having centers adapted to take on the center-pin of the plane surface and having thereon scales of sines and cosines in relation to said center and the graduated quadrant of the plane surface substantially as herein described and explained.

2. An improved instrument for graphically solving spherical triangles on a plane surface consisting essentially of a rectangular plane surface on which are inscribed a graduated quadrant and various trigonometric and other scales in relation to said quadrant a slide on the slide-rule principle having thereon a scale of cosines and a scale of tangents in relation to said graduated quadrant and covering up the numbering of a scale of sines also in relation to said graduated quadrant a center-pin on said plane surface at the center of the graduated quadrant and a removable transparent radius-bar having two centers each adapted to take on the center-pin of the graduated quadrant of the plane surface and having scales of sines and cosines in relation to one such center (red) and having a scale of versines in relation to other said center (blue) which latter center is distant from the former the radius length of the graduated quadrant of the plane surface substantially as herein described and explained.

3. An improved instrument for graphically solving spherical triangles on a plane surface consisting essentially of a rectangular plane surface on which are inscribed a graduated quadrant and various trigonometrical and other scales in relation to said quadrant a slide on the slide-rule principle having thereon a scale of cosines and a scale of tangents in relation to said graduated quadrant and covering up the numbering of a scale of sines also in relation to said graduated quadrant a center-pin on said plane surface at the center of the graduated quadrant and removable transparent radius bar or bars having scales as set forth inscribed thereon substantially as herein described and explained.

In testimony whereof I have signed my name to this specification in the presence of two subscribing witnesses.

HERBERT HENRY EDMONDS.

Witnesses:
  FRED WALSH,
  PERCY NEWELL.